US010131501B1

United States Patent
Kopf

(10) Patent No.: US 10,131,501 B1
(45) Date of Patent: Nov. 20, 2018

(54) CHAIN GUIDE FOR PADDLE-TYPE CONVEYOR

(71) Applicant: Keith Kopf, Pullman, WA (US)

(72) Inventor: Keith Kopf, Pullman, WA (US)

( * ) Notice: Subject to any disclaimer, the term of this patent is extended or adjusted under 35 U.S.C. 154(b) by 0 days.

(21) Appl. No.: 15/599,425

(22) Filed: May 18, 2017

(51) Int. Cl.
*B65G 19/26* (2006.01)
*B65G 19/22* (2006.01)
*A01D 61/04* (2006.01)

(52) U.S. Cl.
CPC .............. *B65G 19/22* (2013.01); *A01D 61/04* (2013.01); *B65G 19/26* (2013.01)

(58) Field of Classification Search
CPC ...................................................... B65G 19/28
USPC .................................. 198/721, 735.1, 735.3
See application file for complete search history.

(56) References Cited

U.S. PATENT DOCUMENTS 5,959,218 A * 9/1999 Strubbe .............. A01D 41/1271
 73/861.71
2017/0334651 A1* 11/2017 Miller ....................... B07C 5/36

* cited by examiner

*Primary Examiner* — Gene O Crawford
*Assistant Examiner* — Rushin Lester, III
(74) *Attorney, Agent, or Firm* — Duncan Palmatier

(57) ABSTRACT

A guide that fits over a paddle link in a paddle-type elevator in a harvester combine grain elevator. The plastic guide provides a wide, low-friction surface that rides on the intermediate wall of a grain elevator, thereby keeping the paddle links from rubbing against and causing wear to the intermediate wall. The guide also serves to inhibit the paddle from tipping back, thereby preventing the concentration of force by one corner of a paddle link against the intermediate wall. The guide al so helps maintain the correct orientation of flexible paddle against the inside of the elevator housing, thereby inhibiting the paddle from tipping back and leaking grain back into the upward path of the conveyor. The plastic guide also reduces noise caused by the metal parts of a paddle-type elevator from coming into contact.

16 Claims, 10 Drawing Sheets

Fig. 4A
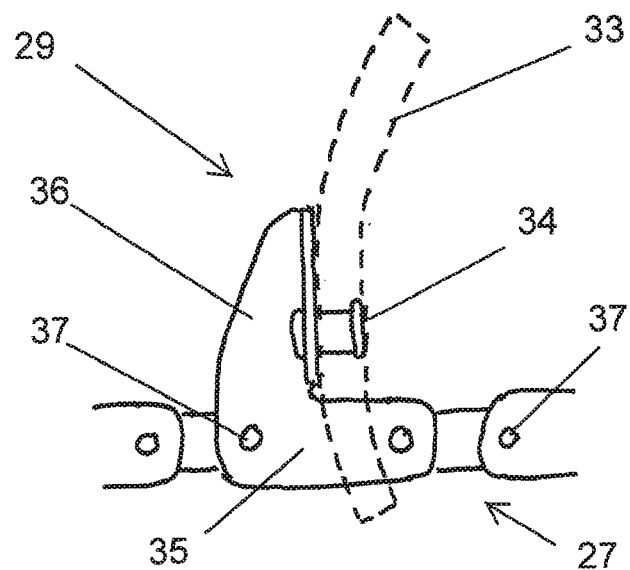
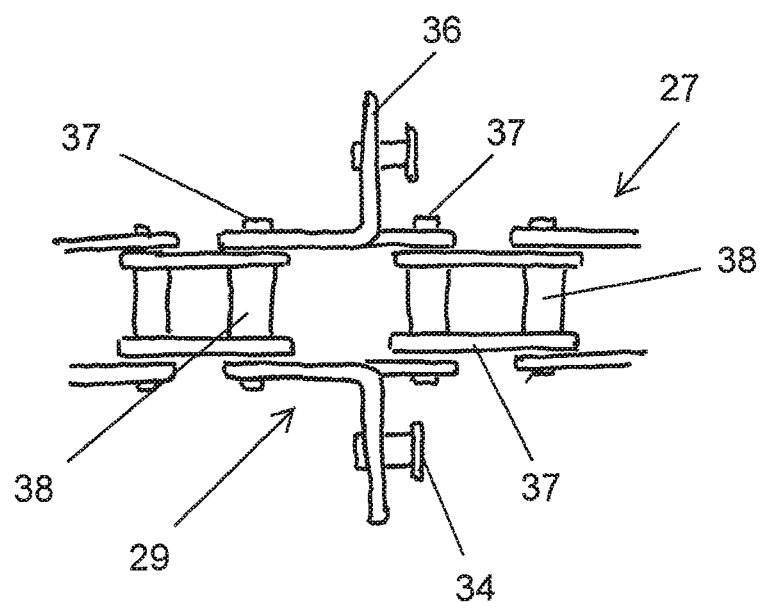
Fig. 4B

CHAIN GUIDE FOR PADDLE-TYPE CONVEYOR

FIELD OF THE INVENTION

The present invention relates to a chain guide. More specifically, the invention relates to a chain guide for a paddle-type conveyor in a combine harvester.

BACKGROUND OF THE INVENTION

By way of general background, referring to FIG. 1, a harvester combine 10 is used to harvest crops, such as wheat. The combine has a header 11 at the front for reaping the wheat and collecting it into a feederhouse 12 where it is carried to a thresher 13 within the combine 10. The thresher 13 separates the grain and chaff from the straw then directs the partially clean grain to the shoe, where chaffer and sieves 14 further winnow the chaff from the grain. The straw and chaff are discharged out the back 19 of the combine 10 and the clean grain is collected at the bottom of a grain elevator 15. In this implementation, the elevator 15 is a paddle-type, endless-chain conveyor that lifts the grain on paddles upward to an auger 16 which in turn moves and discharges 17 the grain into a hopper 18.

Referring now to FIGS. 2 through 4, the paddle-type elevator 15 is formed by an elongated rectangular housing 21. The bottom 22 of the housing 21 is located near the lower area of the combine 10 where the clean grain is received from the chaffer and sieves 14. The top 23 of the housing 21 is located near the upper part of the combine where grain is poured into the auger 16 and thence to the hopper 18. Between the bottom 22 and top 23 of the housing 21 is an endless link chain 27 which rides within the housing 21 between a bottom sprocket 25 near the bottom 22 of the elevator 15 and a top sprocket 26 near the top 23 of the elevator 15. Between the bottom 25 and top 26 sprockets and separating the chain 27 is an intermediate wall 28 that divides the elevator housing 23 into two mostly vertical chambers. Incorporated into the links of the chain 27 are flexible paddles 29 that scoop up grain 30 from the bottom 22 of the elevator 15 and raise the grain 30 between the intermediate wall 28 and the inner wall of the housing 21 to the top 23 of the elevator 15, where the grain 30 is flung or falls down from the paddle 29 through the elevator outlet 24 to the auger 16, which discharges 17 it into the hopper 18. The flexible paddles 29 are supposed to form a seal between the intermediate wall 28 and the other inner surfaces of the elevator housing 23, but the chain 27 is not intended to tide on the intermediate wall 28.

FIGS. 3 through 4B show how the paddles 29 are incorporated into the chain 27. A paddle link 35 is incorporated into the endless chain 27. The paddle link 35 has a paddle support 36 to which a flexible paddle 33 is secured by a fastener 34. A gap 39 in the paddle 33 allows the chain 27 to pass through. Paddles 33 are constructed of layers of flexible materials, such as rubber and cord. The paddle link 35 usually forms one of the outer chain plates 31, which are linked to inner plates 32 by pins 37. Rollers 38 separate the inner plates 32 and the pins 37 hold the plates, 31 and 32, together.

Referring now to FIGS. 5 and 10, a problem with paddle-type elevators 15 is that, as the paddles 29 scoop up grain, the weight of the grain 30, as well as friction between the outer edge of the flexible paddle 33 and the inside walls of the elevator housing 23, cause the outer edge of the paddle 33 to flex backward, as shown at 41, which in turn causes the paddle link 35 to swivel back and rub against the intermediate wall 28, as shown at 42. Because the paddle link 35 swivels back under load, the force exerted by one corner of the paddle link 35 against the intermediate wall 28 is concentrated (as at 42), which results in premature wear to the intermediate wall and the paddle link 35. When the wear to the intermediate wall 28 is too great, or the wear creates gaps, holes, or tears in the intermediate wall 28, the only option is to replace the elevator, which is an expensive and time consuming repair. Because this wear tends to occur during the peak of harvesting, the expense and delay of repair can cause significant losses to the farmer, What is needed is a solution to the problem of such wear to a paddle-type elevator.

SUMMARY OF THE INVENTION

The present invention is a plastic guide that fits over a paddle link in an endless roller chain, The chain guide of the present invention is well suited for use in a paddle-type elevator, such as in a combine. The plastic guide provides a wide, low-friction surface that rides on the intermediate wall of an elevator, thereby keeping the steel paddle link from nabbing against and causing wear to the intermediate wall. The guide also serves to inhibit the paddle from tipping back, thereby preventing the concentration of force at one corner of a paddle link against the intermediate wall. The guide also helps maintain the correct orientation of flexible paddle against the inside of the elevator housing, thereby inhibiting the paddle from tipping back and leaking grain back into the upward path of the conveyor. The plastic guide also reduces noise caused by the metal parts of a paddle-type elevator from coming into contact.

BRIEF DESCRIPTION OF THE DRAWINGS

FIG. 4A is a partial side view of a conveyor chain paddle link with the paddle shown in broken lines.

FIG. 4B is a partial top view of a conveyor chain paddle link without a paddle.

DETAILED DESCRIPTION

Figure 1:
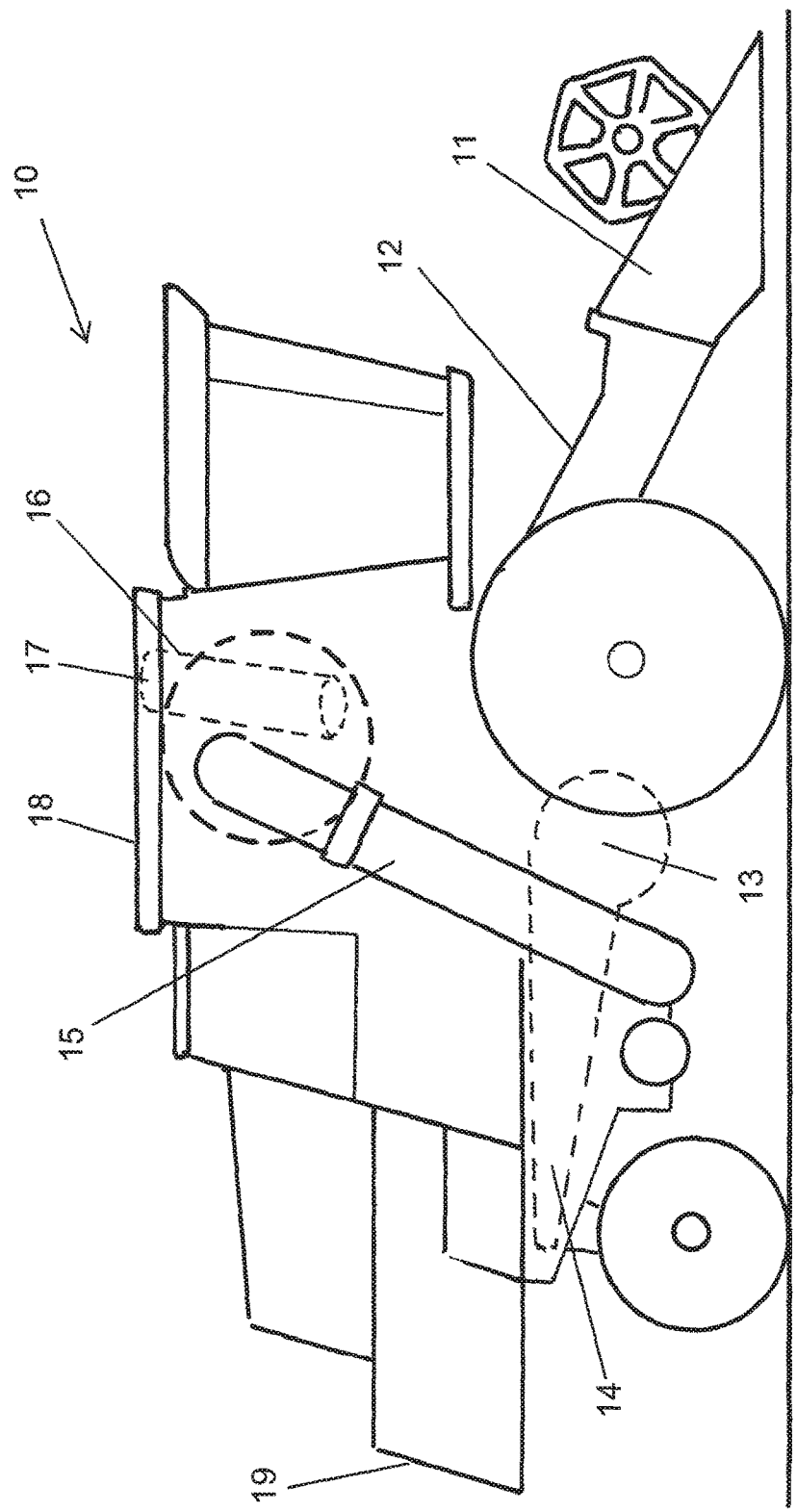
FIG. 1 is a side view of a conventional combine harvester with a side conveyor.
Figure 2:
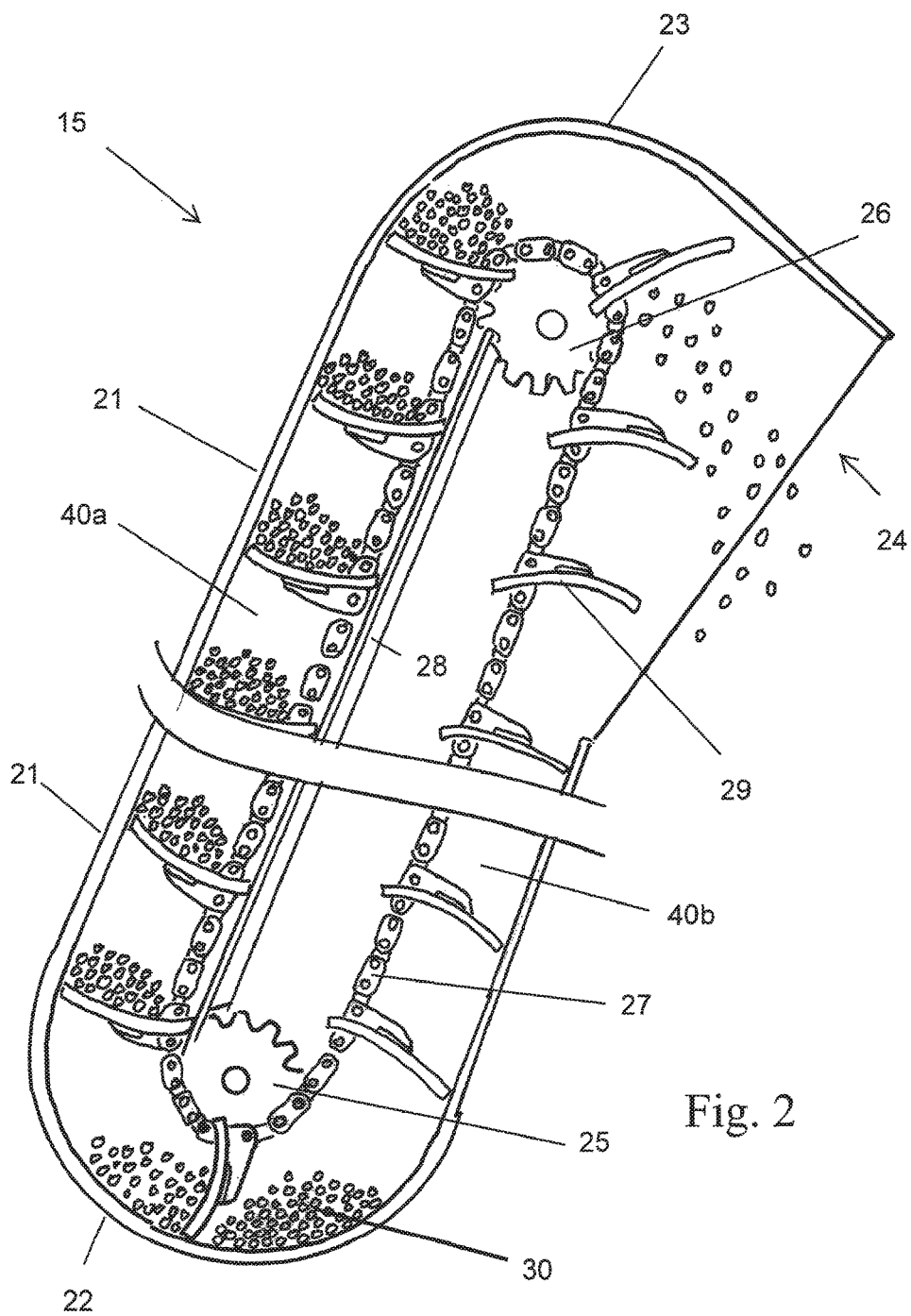
FIG. 2 is a partial cut-away, side view of the bottom and upper portions of a conventional paddle-type conveyor.
Figure 3:
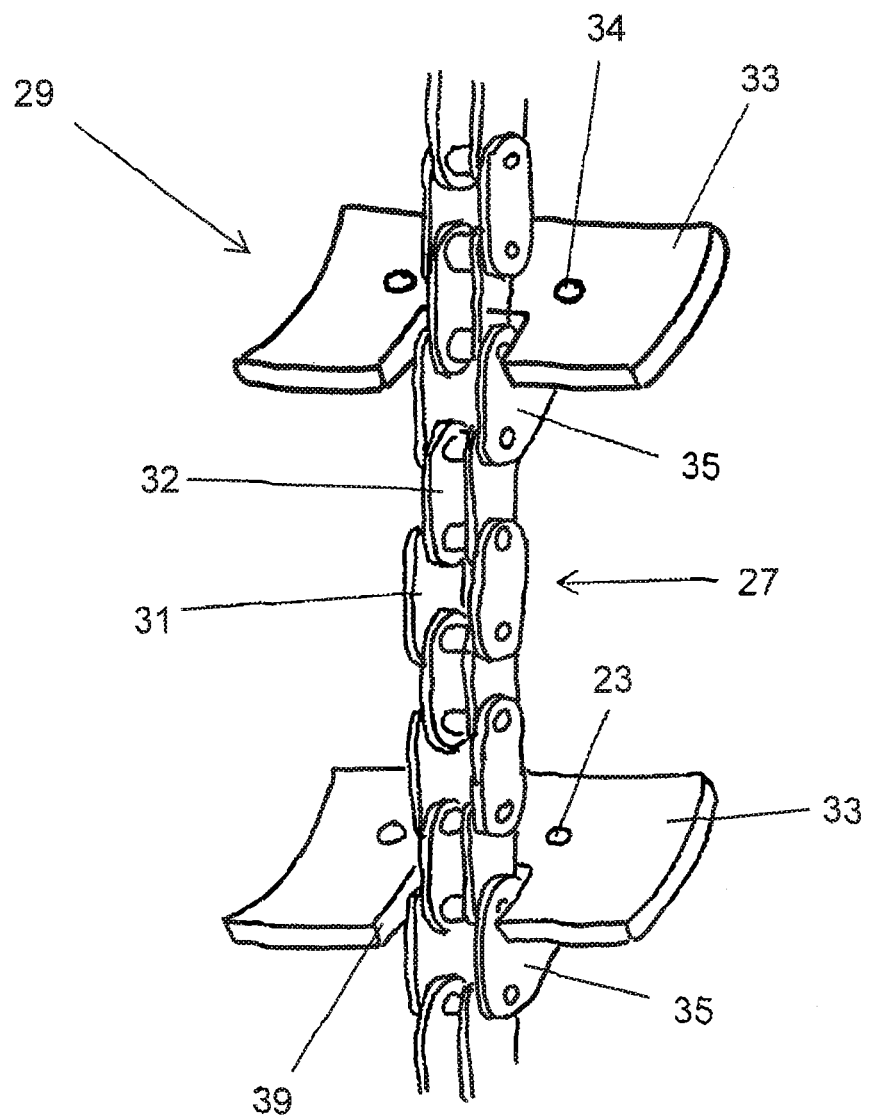
FIG. 3 is a three-quarter, perspective view of a conventional conveyor chain with paddles mounted to it.
Figure 5:
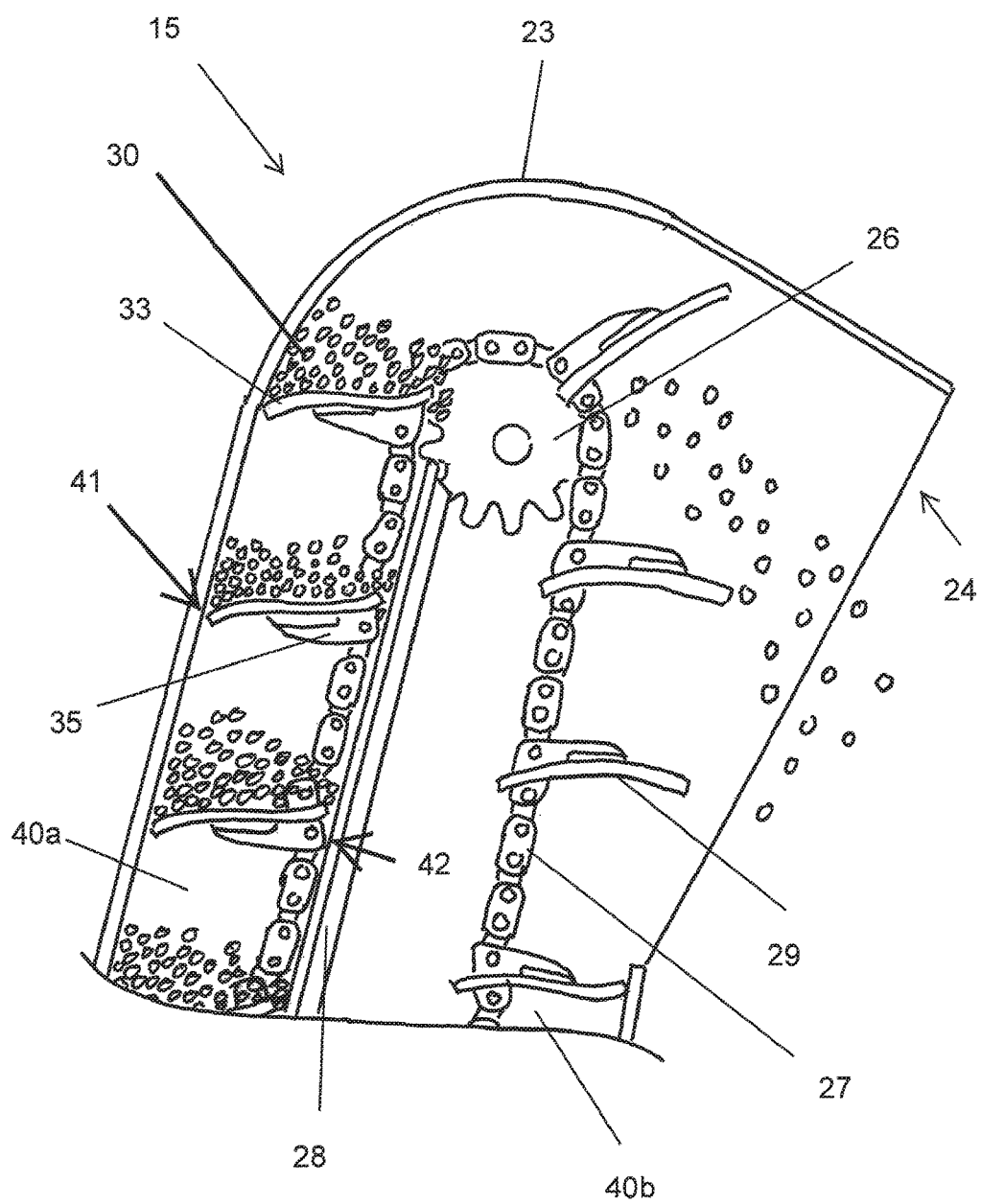
FIG. 5 is a partial cut-away, side view of the upper portion of a conventional paddle-type conveyor in operation.
Figure 10:
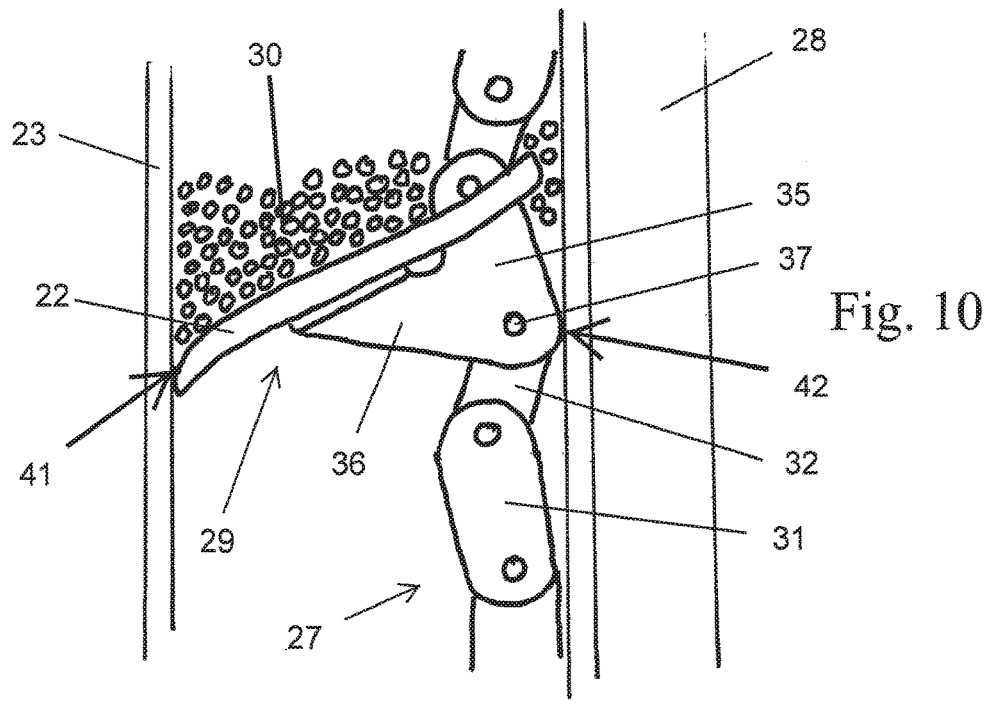
FIG. 10 is a side view of a conventional paddle link under load.

As noted in the Background section above, a paddle-type, endless chain elevator 15, such as shown in FIGS. 2 through 5 and 10, is enclosed by a substantially vertical, elongated rectangular housing 21. An endless chain 27 runs between bottom 25 and top 26 sprockets within the elevator housing 23. One of the sprockets drives the chain. An intermediate wall 28 separates the sides of the chain 27 and divides the elevator housing 23 into a pair of substantially vertical chambers, upward chamber 40*a* and return chamber 40*b*. Clean grain 30 is received at the bottom 22 of the housing 21, where paddles 29 incorporated into an endless chain 27 scoop up the grain 30 and carry it within the upward chamber 40*a* to the top 23 of the housing 21. As the paddles 29 ride over the top sprocket 26, the paddles 29 arc through a vertical position to a downward facing horizontal position, during which the grain 30 is flung or dropped downward and out the elevator's 15 outlet 24 to the auger 16 which transfers the grain 30 to the hopper 18. The chain 27 then continues down the return chamber 40*b* and the process continues.

The flexible paddles 33 are held by paddle links 35 incorporated as links in the endless chain 27. The paddle link 35 has a paddle support 36 to which the paddles 33 are fixed. A gap 39 in the paddles 33 allows the chain 27 to pass through, so that the paddle 33 forms a seal, between the intermediate wall 28 and the three inner walls of the elevator housing 23, sufficient to prevent grain 30 from leaking back down into the upward chamber 40*a*. These paddle links 35 are usually formed as outer links, like the outer plates 31 shown in FIG. 3. At each longitudinal end of the paddle link 35 is a bore for a link pin 37, which corresponds with an axial roller bore in an inner link 32, thereby joining the paddle link 35 into the chain 27. Separating the plates of the inner link 32 are roller bushings 38 aligned about the axis of the pin 37. The roller bushings 38 allow low friction movement of the chain 27 around the sprockets, 25 and 26. The pins 37 are riveted in place, on either side of the paddle link 35 or outer link 31 to hold the inner link 32 in place, yet allow rotational movement about the pin 37. In conventional combine elevator 15 chains 27, the steel side plates of the paddle links 35, outer links 31, and inner links 32, are typically about 2½ inches long and an ⅛ inch thick.

As described above and shown in FIGS. 5 and 10, conventional paddle-type elevator chains are prone to wear, because the paddle links 35 swivel back about the rearmost pin 37 owing to the friction on outside edge of the paddle 33 against the wall of the housing 23 and the weight of the grain 30. This swiveling force causes the rearmost edge of the paddle link 35 to rub against the intermediate wall 28, shown by arrow 42, resulting in wear to the intermediate wall 28 and premature failure of the elevator housing 23.

Figure 6:
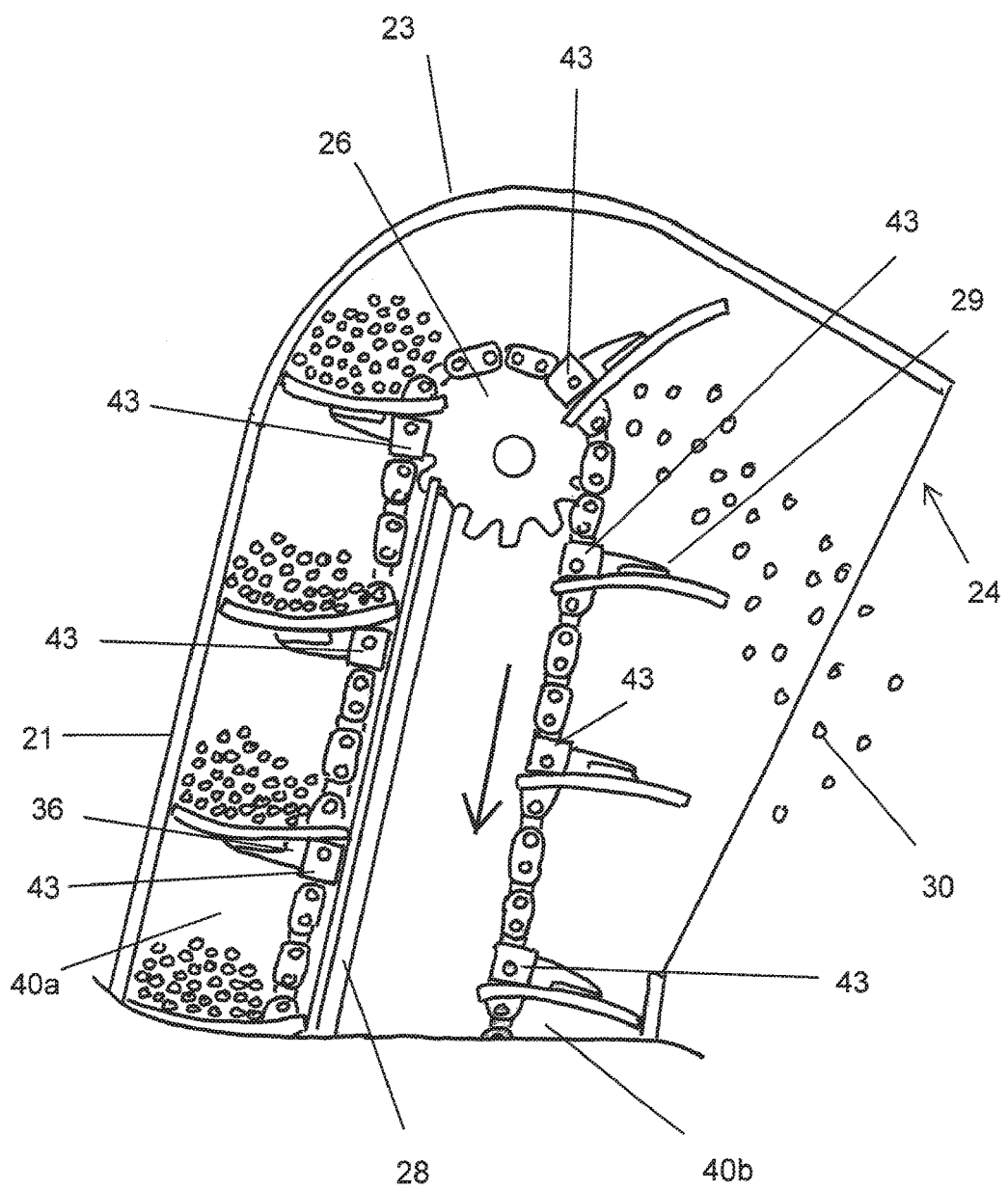
FIG. 6 is a partial cut-away, side view of the upper portion of a paddle-type conveyor with the chain guide of the present invention.
Figure 7:
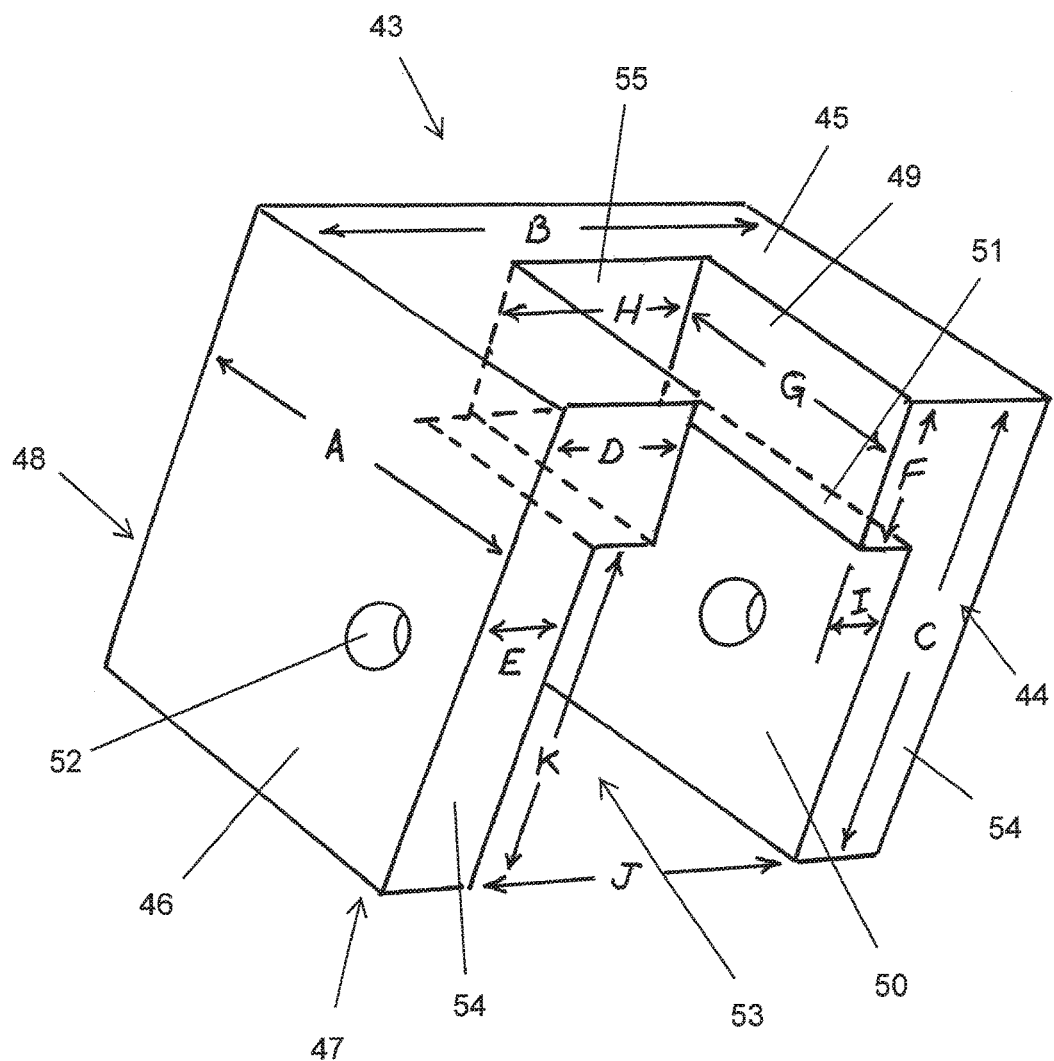
FIG. 7 is a three-quarter perspective view of the chain guide of the present invention, shown from the bottom rear.
Figure 8A:
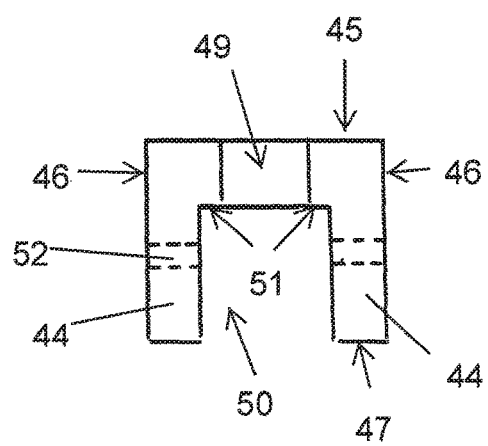
FIG. 8A is a bottom view of the chain guide of the present invention.
Figure 8B:
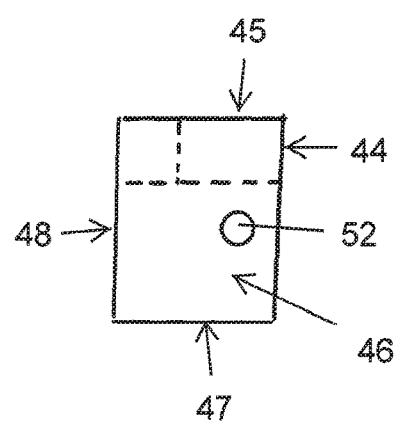
FIG. 8B is a side view of the chain guide of the present invention.
Figure 8C:
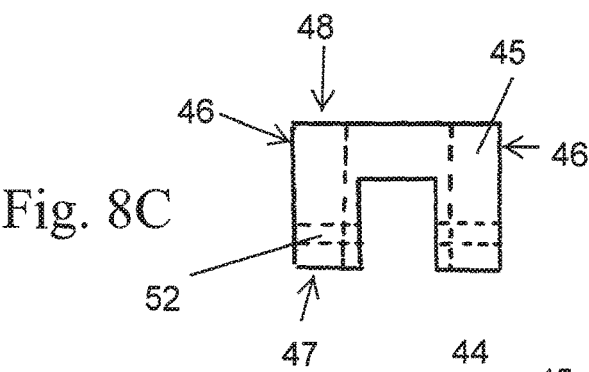
FIG. 8C is a rear view of the chain guide of the present invention.
Figure 8D:
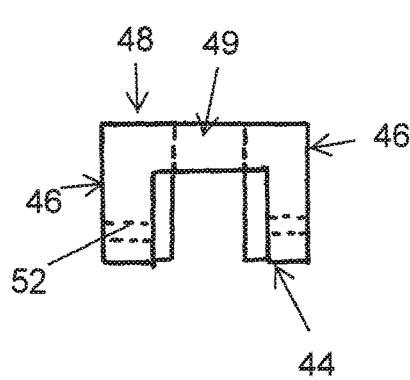
FIG. 8D is a front view of the chain guide of the present invention.
Figure 8E:
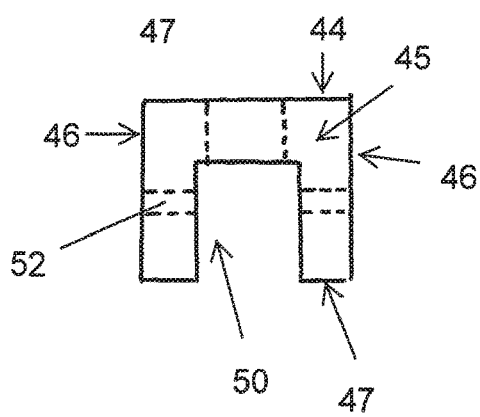
FIG. 8E is a top view of the chain guide of the present invention.
Figure 9:
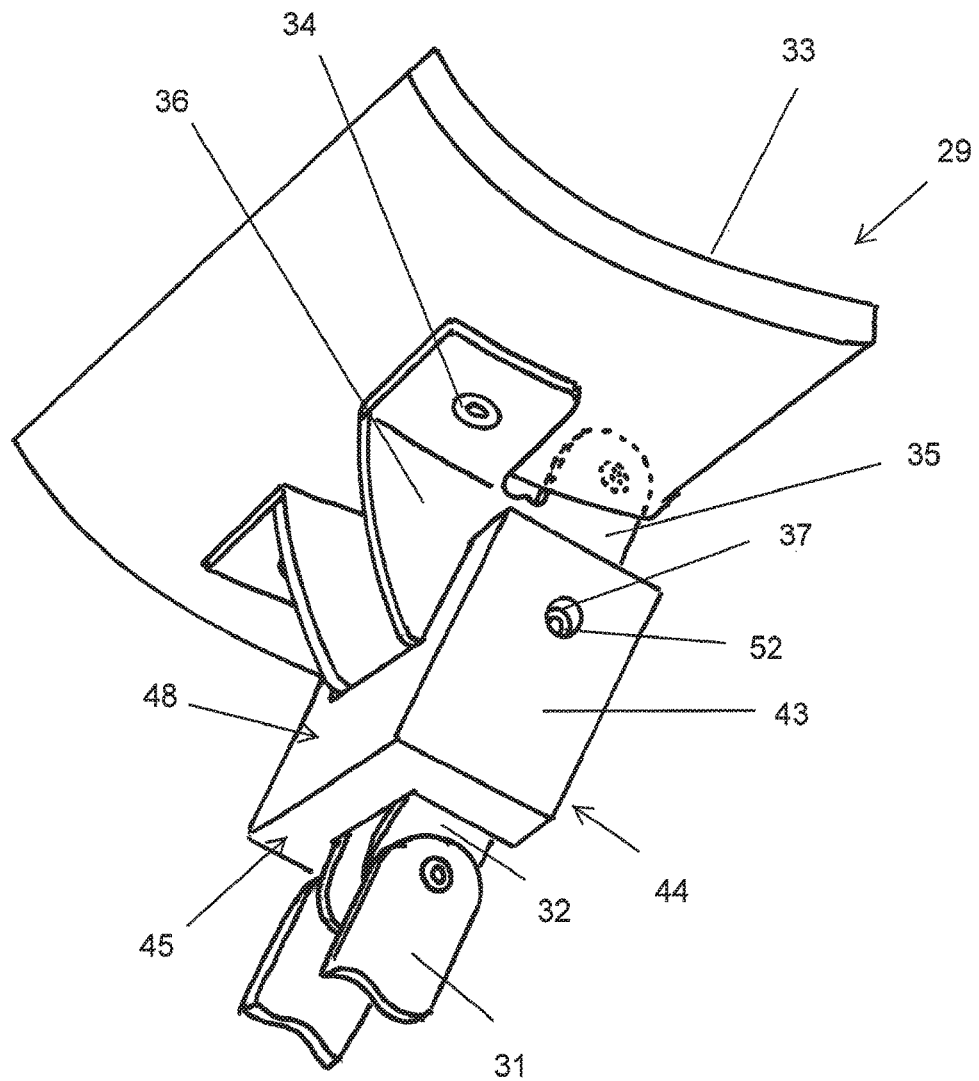
FIG. 9 is a three-quarter perspective view of the guide of the present invention mounted on a paddle link, shown from the top rear.
Figure 11:
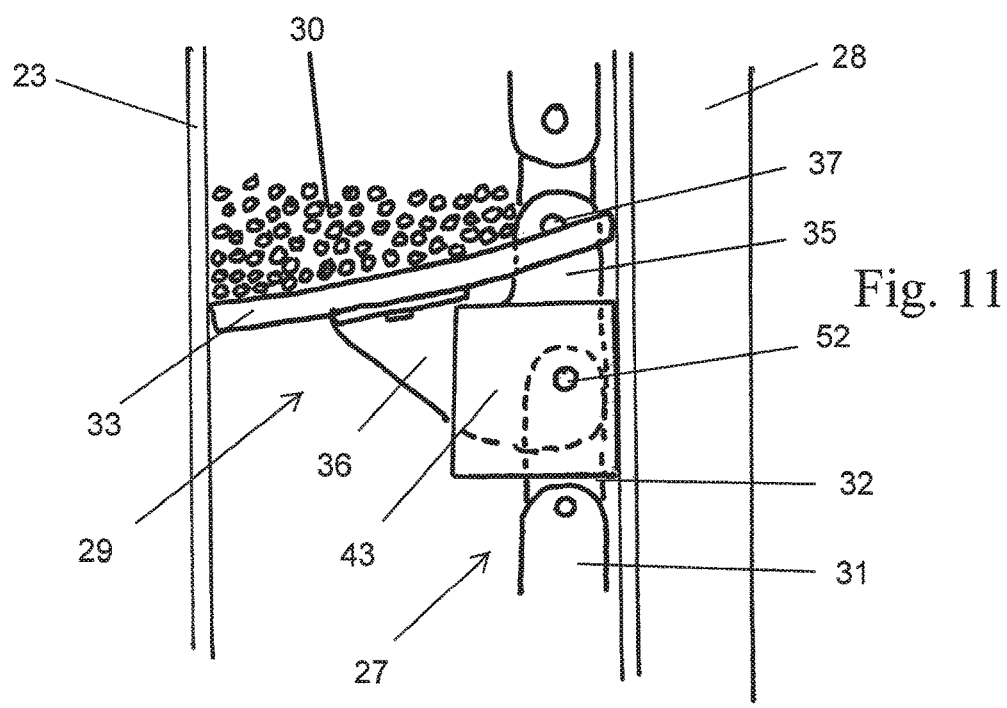
FIG. 11 is a side view of the guide of the present invention mounted on a paddle link.

The present invention is a guide 43, as shown in FIGS. 6 through 9 and 11, that fits over the paddle link 35 and distributes the forces acting against the paddle 29 through the guide's 43 skids 54, which slide on the surface of the intermediate wall 28. In addition to distributing the load over the guide's 43 skids 54, the guide runs closer to the intermediate wall 28 than the chain 27, thereby allowing less slack in the chain 27 and inhibiting the paddle link 35 from swiveling back. Also, the space 49 in the guide 43 for the inner link 32 to pass has a top wall 55 that forms a stop to prevent the forward end of the inner link 32 from swiveling upward and allowing the paddle link 35 to swivel back (as at 42 in FIGS. 5 and 10); yet, when the forward inner link 32 and paddle link 35 pass over a sprocket, 25 or 26, the open guide space 49 allows the rearward ends of the links to swivel and travel around the sprocket.

In the disclosed embodiment, the guide 43 is generally rectangular, with a height A from the skids 54 on the bottom 44 to the top 48 of the guide 43) of about 1½ inches, a width B (between the guide's 43 sides 46) of 2¼ inches, and a length C (from the front 45 to the back 47 of the guide 43) of about 2 inches. The space 49 for the inner link 32 has a width H of about 1 1/16 inches, which accommodates a conventional inner link with a width of about 1 inch. The guide's 43 inner link space 49 extends backward from the chain's 27 direction of travel by a length F of about ¾ inch. Space 49 has a height C of about 1 inch, a little more than the 13/16 inch height of a conventional chain link. The height G of inner link space 49 allows the guide's 43 skids 54 to extend about 3/16 inch below the bottom edge of the inner link 32 and paddle link 35, and allows some space above the top edge of the inner link 32 for upward rotation, yet forms a stop 55 to prevent further upward rotation of the inner link 32. The stop 55 helps to inhibit the paddle link 35 from swivelling back. The space 50 for the outer paddle link 35 has a width J of 1⅜ inches, which provides a close friction fit with a conventional outer link 31 which, like the paddle link 35, has a width J of 1⅜ inches. A step 51 in from the inner link space 49 to the paddle link space 50 aligns with and butts against the leading edge of the paddle support 36. The step has a width J of about ⅛ inch, corresponding to the width of a conventional chain link plate. The tight fit between the guide's 43 paddle link space 50 and the paddle link 35 itself, as well as the alignment of the step 51 with the leading edge of the paddle support 36 inhibits rotation of the guide 43 and holds the guide 43, with the paddle link 35, in the direction of the chain's 27 travel. The paddle link space 50 extends forward to the direction of travel by a length K of about 1¼ inch. A bore 52 is sized to receive the head of a pin's 37 rivet on the outside of the paddle link 35 and thereby hold the guide 43 in place. Such pins 37 commonly have riveted heads of about ¼ inch in diameter, so a suitable bore (or, an indent in the guide's paddle link inner side wall 53) would be ¼ to 5/16 inch. The length K of the paddle link space 50 is about half the length of a conventional 2½ inch chain link, which covers the rear edges of the paddle link 35 from the direction of the chain's 27 travel. Thus, the guide's 43 skids 54 extend 2 inches in the direction of the chain's 27 travel, from the trailing inner link's 32 mid section to the midway point of the paddle link 35. The skids 54 of guide 43 are wide enough to provide a surface that will slide on the intermediate wall 28 without excessive friction and provide stability to the paddle 29. In the disclosed embodiment, the skids 54 have a width D of ⅝ inch on either side of the trailing inner link 32 and a width E of 7/16 inch on either side of the paddle link 35. Comparing the skid widths D and E to the ⅛ inch width of a convention chain link, gives a ratio of 5:1 for the skid width D compared to the trailing inner link's 32 edge, and a ratio of 3.5:1 for the skid width E compared to the paddle link's 35 edge.

The guide 43 is preferably made of a plastic material, such as nylon or polyester, which are easy and cheap to produce, by molding, for example, provide low friction against the steel intermediate wall 28, and are strong and durable. Silicone impregnated nylon has been found to work well.

The drawings and description set forth here represent only some embodiments of the invention. After considering these, skilled persons will understand that there are many ways to make a harvester combine elevator chain guide according to the principles disclosed. The inventor contemplates that the use of alternative structures, materials, or manufacturing techniques, which result in a chain guide according to the principles disclosed, will be within the scope of the invention.

I claim:

1. A grain elevator chain guide comprising:
   an endless roller chain comprising inner links formed by inner side plates having front and rear inner plate ends and held apart from each other in a spaced relationship by roller bushings located at each of the rear and front inner plate ends, each roller bushing having an axial bushing bore, the endless roller chain further comprising outer links formed by outer side plates having front and rear outer plate ends and openings in each of the front and rear outer plate ends, wherein the opening of the front outer plate end is aligned with and rotatably connected with the axial bushing bore of the rear inner plate end of one of the inner links by one of a plurality of link pins, and the opening of the rear outer plate is aligned with and rotatably connected with the axial bushing bore of the front inner plate end of another of the inner links by another link pin;
   at least one paddle link formed as part of one of the outer links, the paddle link comprising at least one paddle support extending out from the outer link generally tangential to the roller chain's direction of travel, and a paddle attached to the paddle support,
   a chain guide having a front, a rear opposite the front, oppositely disposed sides, a top, a bottom opposite the top, a low friction guide surface formed in the bottom, wherein the chain guide further comprises a paddle link space between the first and second sides and open at the front and bottom and rear, wherein the paddle link space is sized to accommodate the side plates of the paddle link within the paddle link space, and wherein the chain guide further comprises an inner link space between the first and second sides, open at the rear and bottom, and forming a ceiling above the inner link space and below the top of the chain guide, wherein the inner link space is defined to accommodate the side plates of the inner link within the inner link space without preventing the inner link from rotating about the link pins, and wherein the ceiling stops rotation of the inner link in one direction.

2. The grain elevator chain guide of claim 1, wherein the paddle link space further comprises a top opening in a portion of the top of the chain guide sized to allow the paddle support to pass through.

3. The grain elevator chain guide of claim 1 further comprising rivet spaces in the inner walls of the first and second sides of the paddle link space, wherein the rivet spaces are aligned with heads at each end of the link pins.

4. The grain elevator chain guide of claim 2 wherein paddle link space is sized to form a close friction fit over the paddle link.

5. The grain elevator chain guide of claim 3 wherein the chain guide is constructed of plastic.

6. The grain elevator chain guide of claim 5 wherein the plastic is low friction.

7. The grain elevator chain guide of claim 6 wherein the plastic is silicone impregnated nylon.

8. The grain elevator chain guide of claim 1 wherein the guide surface is formed in the bottom of the chain guide on either side of bottom edges of the inner and paddle link side plates.

9. The grain elevator chain guide of claim 8 wherein the guide surfaces have skid widths of at least twice a thickness of the side plates of the inner links.

10. The grain elevator chain guide of claim 8 wherein the guide surfaces have skid widths of at least three-eighths of an inch.

11. A chain guide for a continuous roller chain operating in a loop, the roller chain having outer and inner links alternately coupled along a chain drive direction, wherein the outer link comprises a pair of oppositely disposed side plates, each side plate having a first end and a second end opposite the first end, the first and second ends of the side plates oriented along the the chain drive direction, an outer side plate length from the first to the second end, an outer side plate thickness, an outer side plate edge extending around a perimeter of the outer side plate, an outer side plate top edge extending along the outer side plate length outside the continuous roller chain loop and an outer side plate bottom edge extending along the outer side plate length inside the continuous roller chain loop, an outer side plate height from the bottom edge to the top edge of the outer side plate and normal to the outer side plate length, lateral pin bores adjacent the first and second ends, wherein the pin bores are aligned with axial roller bores of roller chain inner links, wherein the chain guide comprises:
    a body having a length, width, height, and bottom, the body further comprising an internal space sized to engage and fit around at least a portion of the outer link side plates, wherein the bottom of the chain guide extends beyond the bottom edge of the outer side plate and forms a skid surface along the bottom of the chain guide.

12. The chain guide of claim 11 wherein the skid surface of the chain guide has a lateral skid width greater than the outer side plate thickness.

13. The chain guide of claim 12 wherein the lateral skid width is at least three times greater than the outer side plate thickness.

14. The chain guide of claim 11 wherein the skid surface of the chain guide is constructed of a low fiction plastic material.

15. The chain guide of claim 11 further wherein the roller chain further comprises at least one paddle link formed as part of one of the outer links, and wherein the internal space of the chain guide is further sized to fit around the paddle link.

16. The chain guide of claim 11 wherein the chain guide is formed of a silicone impregnated nylon material.

* * * * *